United States Patent
Yamane (10) Patent No.: US 11,323,023 B2
(45) Date of Patent: May 3, 2022

(54) TOTEM-POLE SINGLE-PHASE PFC CONVERTER

(71) Applicant: Sony Corporation, Tokyo (JP)

(72) Inventor: Mitsuru Yamane, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/055,878

(22) PCT Filed: Apr. 23, 2019

(86) PCT No.: PCT/JP2019/017113
§ 371 (c)(1),
(2) Date: Nov. 16, 2020

(87) PCT Pub. No.: WO2019/225262
PCT Pub. Date: Nov. 28, 2019

(65) Prior Publication Data
US 2021/0211041 A1    Jul. 8, 2021

(30) Foreign Application Priority Data

May 23, 2018 (JP) .............................. JP2018-098824

(51) Int. Cl.
*H02M 7/219* (2006.01)
*H02M 1/42* (2007.01)

(52) U.S. Cl.
CPC ......... *H02M 1/4208* (2013.01); *H02M 7/219* (2013.01)

(58) Field of Classification Search
CPC .... H02M 1/42; H02M 1/4208; H02M 1/4225; H02M 1/4233; H02M 7/219
See application file for complete search history.

(56) References Cited

U.S. PATENT DOCUMENTS

| | | | |
|---|---|---|---|
| 9,590,494 B1 | 3/2017 | Zhou | |
| 9,847,710 B2* | 12/2017 | Lee | ..................... H02M 1/4258 |
| 10,811,953 B2 | 10/2020 | Hirota et al. | |
| 2007/0279955 A1* | 12/2007 | Liu | ..................... H02M 1/4208 363/125 |
| 2014/0210370 A1 | 7/2014 | Pawellek et al. | |

FOREIGN PATENT DOCUMENTS

| | | |
|---|---|---|
| CN | 107041036 A | 8/2017 |
| JP | 2011-045216 A | 3/2011 |
| JP | 2012-070490 A | 4/2012 |
| JP | 2015-192546 A | 11/2015 |
| JP | 2016-039680 A | 3/2016 |

(Continued)

OTHER PUBLICATIONS

International Search Report issued in International Patent Application No. PCT/JP2019/017113 dated Jul. 2, 2019 and English translation of same. 5 pages.

(Continued)

*Primary Examiner* — Gary L Laxton
(74) *Attorney, Agent, or Firm* — K&L Gates LLP (57) ABSTRACT

A totem-pole single-phase PFC converter which controls low frequency-side node voltage to which an inductor is not connected into a linear shape within two poles of an AC power supply at a timing where a polarity of an input to the AC power supply is reversed.

9 Claims, 12 Drawing Sheets

(56) References Cited

FOREIGN PATENT DOCUMENTS

WO 2017/051814 A1 3/2017

OTHER PUBLICATIONS

Written Opinion issued in International Patent Application No. PCT/JP2019/017113 dated Jul. 2, 2019. 6 pages.
Li Guangdi et al: "An integrated AC-DC converter with isolation and reduced number of power components", 2017 IEEE Southern Power Electronics Conference (SPEC), IEEE, Dec. 4, 2017 (Dec. 4, 2017), pp. 1-6, XP033344582, DOI: 10.1109/SPEC.2017.8333552 [retrieved on Apr. 6, 2018].
Liu Zhengyang et al: "Operation analysis of digital control based MHz totem-pole PFC with GaN device", 2015 IEEE 3rd Workshop on Wide Bandgap Power Devices and Applications (WIPDA), IEEE, Nov. 2, 2015 (Nov. 2, 2015), pp. 281-286, XP032839618, DOI: 10.1109/WIPDA.2015.7369316 [retrieved on Dec. 30, 2015].
Woo-Young Choi et al: "A Novel Single-Stage AC-DC Converter to Supply Sustain Power for Plasma Display Panels", Journal of Display Technology, IEEE Service Center, New York, NY, US, vol. 7, No. 9, Sep. 1, 2011 (Sep. 1, 2011), pp. 494-502, XP011371298, ISSN: 1551-319X, DOI: 10.1109/JDT.2011.2141113.

* cited by examiner

TOTEM-POLE SINGLE-PHASE PFC CONVERTER

TECHNICAL FIELD

The present technique relates to a totem-pole single-phase PFC converter capable of reducing leakage current (touch current).

BACKGROUND ART

Conventionally, in a switching power supply connected to AC input, a PFC (Power Factor Correction) converter is used in order to improve a power factor of input current and to suppress harmonic current. A PFC converter adopts a configuration in which a boost converter (a step-up converter) is used after rectifying AC voltage to positive voltage with a diode bridge. However, since loss on a diode of a rectifier bridge causes efficiency to decline, a bridgeless PFC converter from which a rectifier bridge is omitted has been proposed.

The totem-pole single-phase PFC converter has a problem in that an excessive surge current flows through an inductor at a zero crossing point of input voltage and, consequently, surges occur in input current and input voltage. In addition, such a surge current and a surge voltage increase noise in the converter in the form of EMI (Electromagnetic Interference) noise and harmonic current.

For example, PTL 1 discloses achieving a reduction in noise and an improvement in efficiency by preventing a surge current near a zero crossing point of input voltage.

CITATION LIST

Patent Literature

PTL 1

JP 2012-070490A

SUMMARY

Technical Problem

In addition to the surge current described above, in a configuration that connects a PFC converter and an insulated converter to each other, an occurrence of a leakage current (touch current) that flows from an output side of the insulated converter to an input side of the PFC converter is recognized. The leakage current must be kept at or below a value prescribed by standards from the perspective of preventing electric shock. The leakage current cannot be sufficiently and efficiently reduced with a technique for reducing a spike current that flows toward an AC side as described in PTL 1.

In consideration thereof, an object of the present technique is to provide a totem-pole single-phase PFC converter that is capable of reducing such leakage current.

Solution to Problem

The present technique is a totem-pole single-phase PFC converter which controls low frequency-side node voltage to which an inductor is not connected into a linear shape within two poles of an AC power supply at a timing where a polarity of an input to the AC power supply is reversed.

Advantageous Effects of Invention

According to at least one embodiment, a peak value of a leakage current can be suppressed by controlling low frequency-side node voltage into a linear shape. It should be noted that the advantageous effect described above is not necessarily restrictive and any of the advantageous effects described in the present technique or advantageous effects that differ therefrom may apply.

DESCRIPTION OF EMBODIMENTS

Hereinafter, embodiments and the like of the present technique will be described with reference to the drawings. The description will be given in the following order.

<1. Conventional totem-pole single-phase PFC converter>
<2. First embodiment>
<3. Second embodiment>
<4. Modifications>

It is to be understood that the embodiments and the like to be described below are preferable specific examples of the present technique and that contents of the present technique are not to be limited to the embodiments and the like.

1. Conventional Totem-Pole Single-Phase PFC Converter

Figure 1:
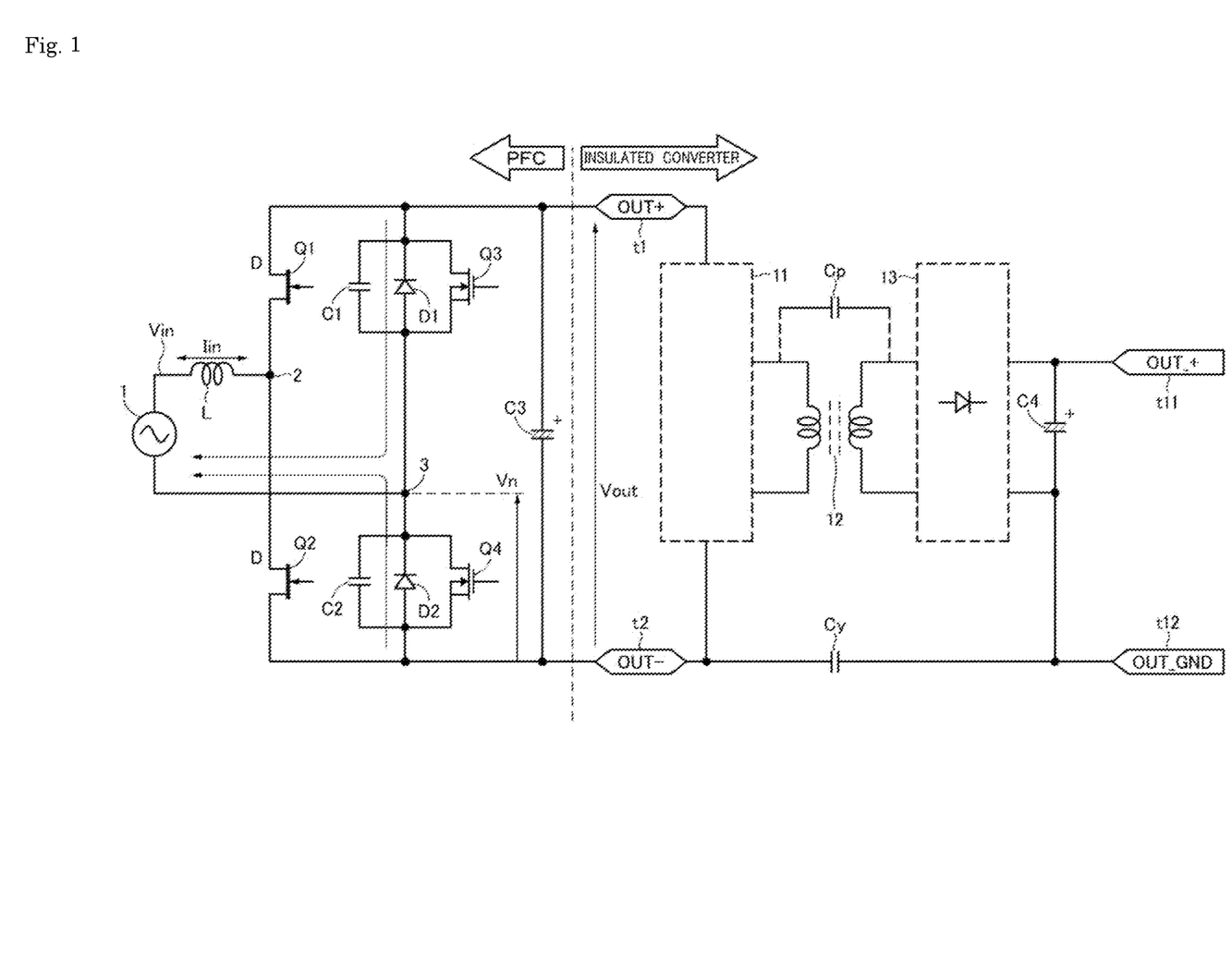
FIG. 1 is a connection diagram of a totem-pole single-phase PFC converter to which the present technique can be applied.

FIG. 1 shows a schematic configuration of an example of a conventional totem-pole single-phase PFC converter. As shown in FIG. 1, a totem-pole single-phase PFC converter (AC-DC converter) (hereinafter, referred to as a PFC converter when appropriate) is connected to an AC power supply 1, and an insulated converter (DC-DC converter) is connected to the PFC converter. The PFC converter has an inductor L, a FET Q1, a FET Q2, a MOSFET Q3, a MOSFET Q4, and a capacitance C3. The FET Q1, the FET Q2, the MOSFET Q3, and the MOSFET Q4 are switching elements. A diode D1 and a capacitance C1 are connected in parallel to the MOSFET Q3, and a diode D2 and a capacitance C2 are connected in parallel to the MOSFET Q4. Voltage Vout is drawn from both terminals (output terminals t1 and t2) of the output-side capacitance C3 of the PFC converter.

A drain of the FET Q1 is connected to the terminal t1, a source of the FET Q2 is connected to the terminal t2, and a source of the FET Q1 and a drain of the FET Q2 are connected to each other. One terminal of the AC power supply 1 is connected via the inductor L to a junction of the source of the FET Q1 and the drain of the FET Q2 or, in other words, a high frequency-side node 2.

A drain of the MOSFET Q3 is connected to the terminal t1, and a source of the MOSFET Q3 is connected to a drain of the MOSFET Q4. A source of the MOSFET Q4 is connected to the terminal t2. Another terminal of the AC power supply 1 is connected to a junction of the source of the MOSFET Q3 and the drain of the MOSFET Q4 or, in other words, a low frequency-side node 3.

The insulated converter adopts a configuration of a switching power supply and has a switching unit 11, a transformer 12, and a rectifying unit 13, and output terminals t11 and t12 are connected to both terminals of an output-side capacitance C4. Isolation is realized by the transformer 12. A capacitance Cp is a stray capacitance that is present between a primary winding side and a secondary winding side of the transformer 12. In addition, a capacitance Cy for noise reduction is inserted between the terminal t2 and the output terminal t12.

Figure 2:
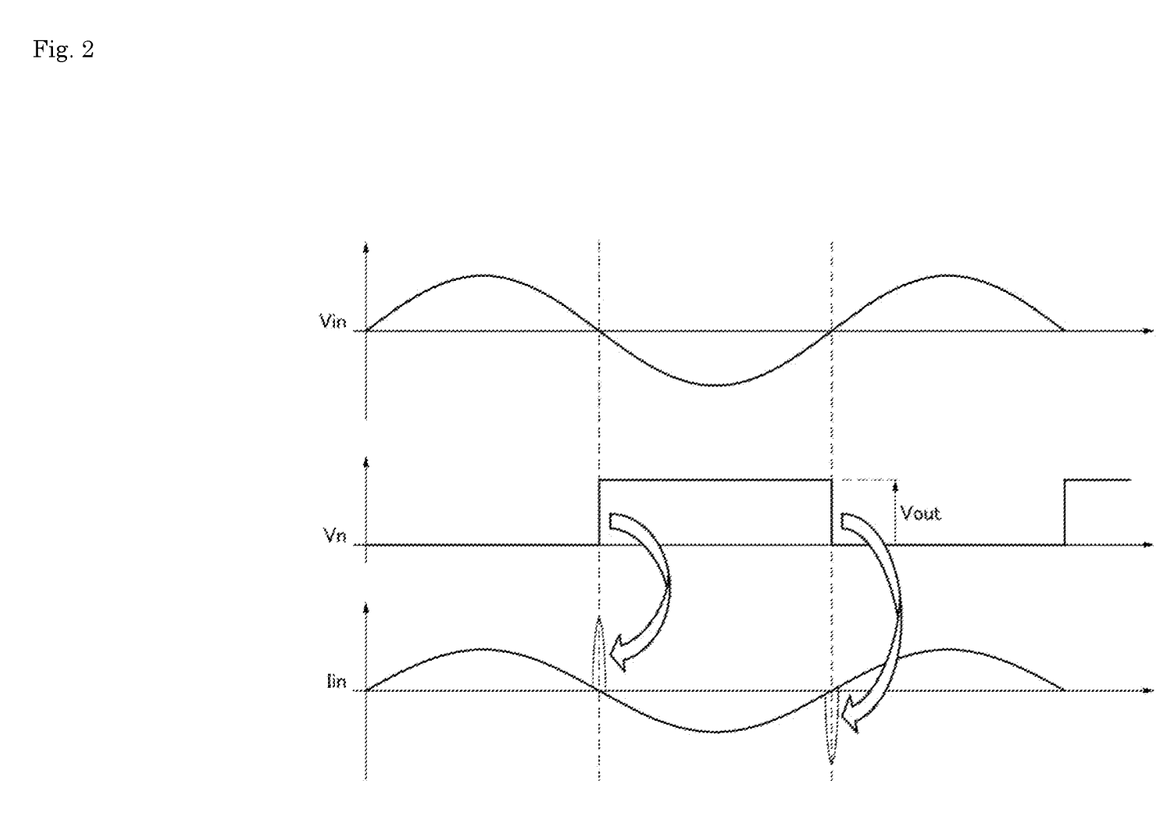
FIG. 2 is a waveform diagram used to explain a problem of a totem-pole single-phase PFC converter.

FIG. 2 respectively shows a voltage Vin of the AC power supply 1, a voltage between the drain and the source of the MOSFET Q4 or, in other words, a low frequency-side node voltage Vn, and an AC current Iin that flows through the inductor L. Although not illustrated, a gate drive signal of each FET is formed by a controller. Switching between the FET Q1 and the FET Q2 is performed by a switching signal with a high frequency such as a frequency around 100 kHz. Switching between the MOSFET Q3 and the MOSFET Q4 is performed in synchronization with the AC power supply 1.

In the totem-pole single-phase PFC converter described above, when polarity of input of the AC power supply is reversed, a node voltage on a low frequency side (referred to as a low frequency-side node voltage) Vn fluctuates by an output voltage (Vout) of the PFC converter. Charges stored in capacitance components (C1 and C2 in FIG. 1) that are present as additional or parasitic components are intentionally charged or discharged to the node and flow as a spike-like current toward a side of the AC power supply as shown in FIG. 2. Since the current causes EMI and harmonic currents, a method of reducing this current is proposed in PTL 1 described at the beginning of the present description and the like. Specifically, every time voltage polarity of an AC input is reversed, control for gradually increasing an on-time ratio of a step-up converter switch from zero or, in other words, soft start control is performed.

Figure 3:
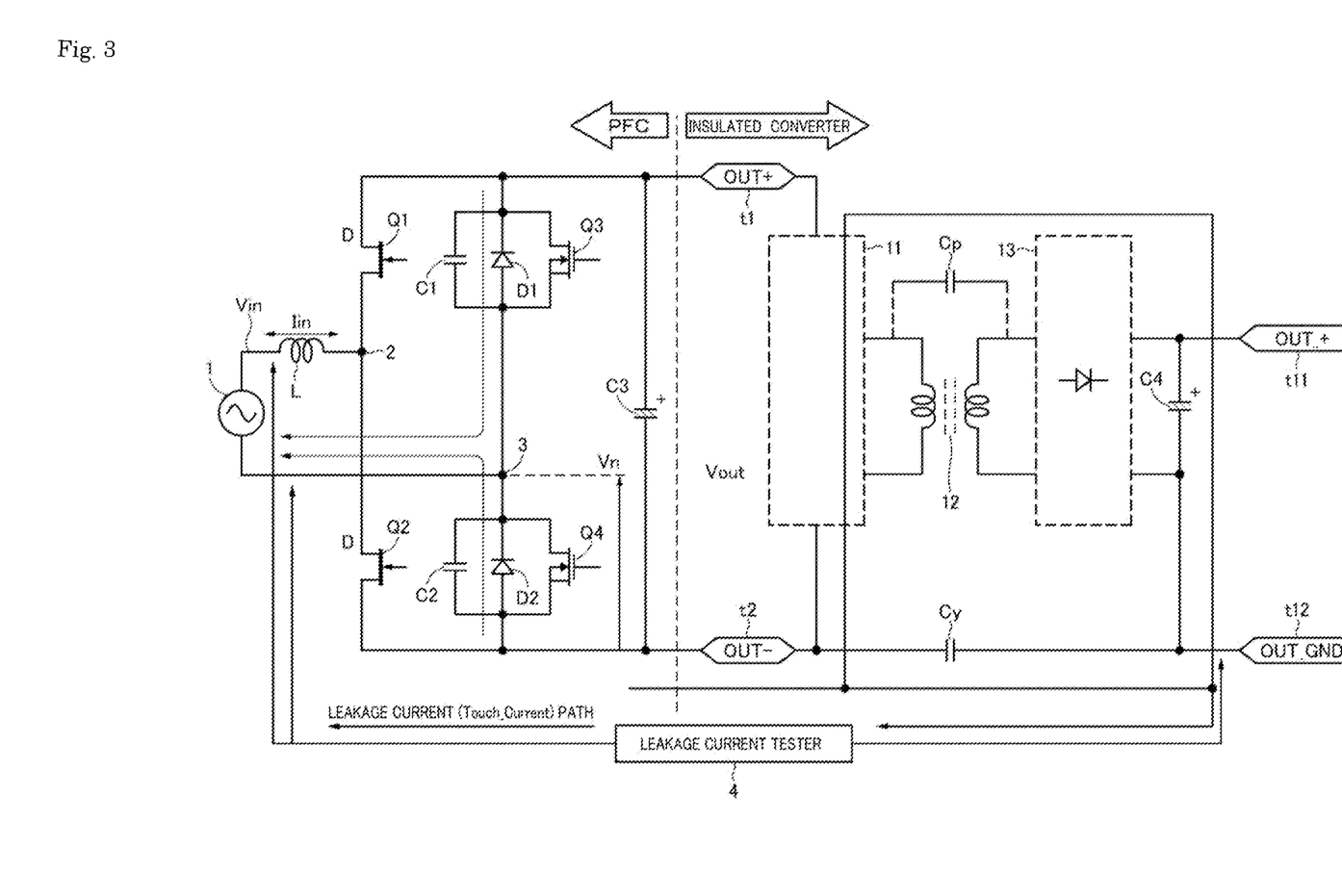
FIG. 3 is a connection diagram for explaining leakage current that occurs in a totem-pole single-phase PFC converter.
Figure 4:
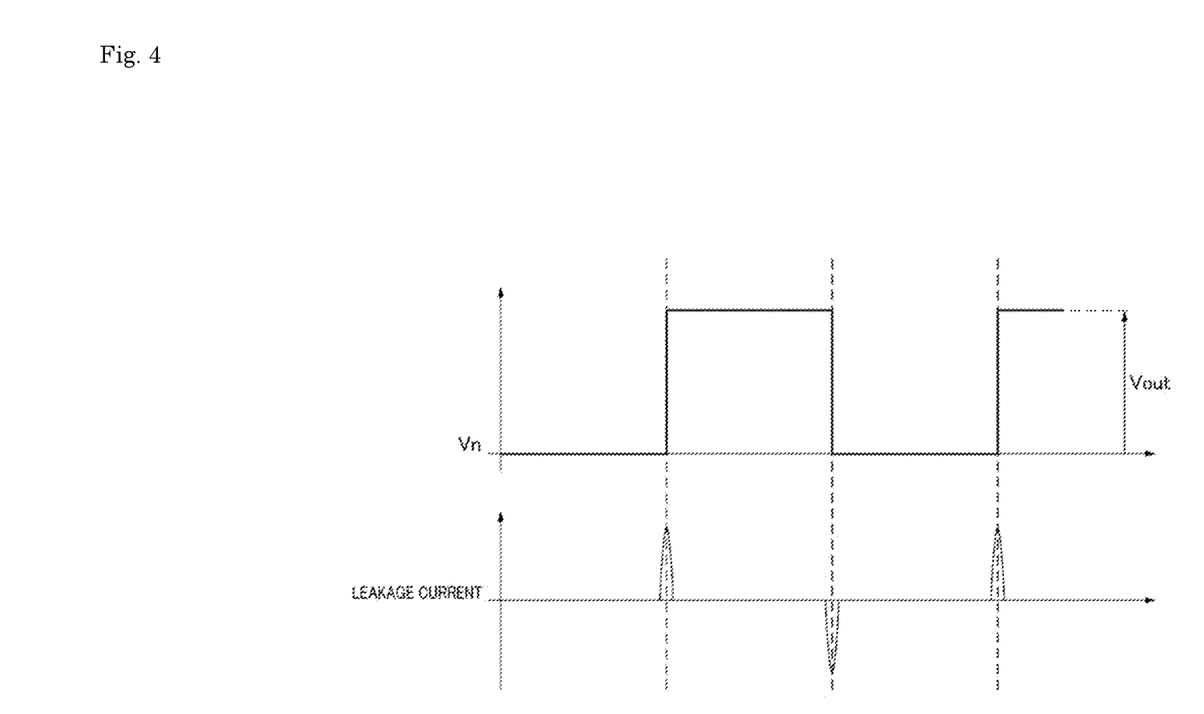
FIG. 4 is a waveform diagram for explaining leakage current.

In addition to the current described above, a current flows as a result of a change in the low frequency-side node voltage Vn being applied to a capacitance component of the capacitance (Cp) between primary and secondary windings (a side of the PFC converter is assumed to be a primary winding side and an output side of the insulated converter is assumed to be a secondary winding side) of the transformer of the insulated converter that is installed in a subsequent stage to the PFC converter or the capacitance (Cp) between primary and secondary windings which is intentionally provided as an EMI countermeasure as shown in FIG. 3, and the current is observed as a leakage current (touch current) as shown in FIG. 4. In other words, a positive pulse-like leakage current flows at a rising time point of the low frequency-side node voltage Vn and a negative pulse-like leakage current flows at a falling time point of the low frequency-side node voltage Vn. As shown in FIG. 3, the leakage current that flows through the stray capacitance Cp and the capacitance Cy can be measured by a leakage current tester 4. The current cannot be sufficiently and efficiently reduced with a conventional technique for reducing a spike current that flows toward an AC power supply side. It should be noted that the MOSFETs Q3 and Q4 replace rectifier diodes in a totem-pole PFC in order to further reduce loss. The MOSFETs Q3 and Q4, together with switching timings thereof, are not directly related to leakage current reduction according to the present technique.

2. First Embodiment

Figure 5:
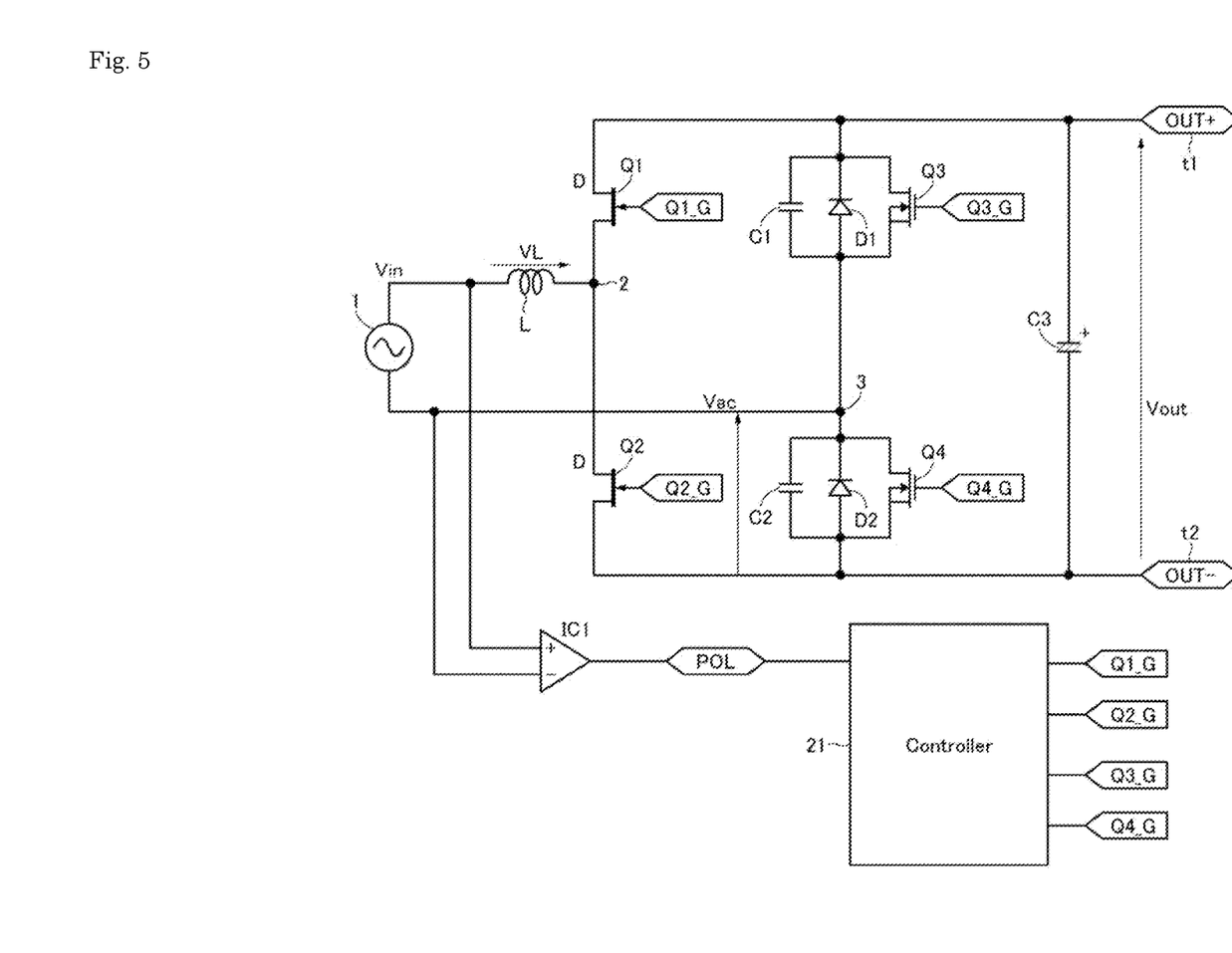
FIG. 5 is a connection diagram of a first embodiment of the present technique.

A first embodiment of the present technique will be described with reference to FIG. 5. The first embodiment involves adjusting a duty of switching of the FETs Q1 and Q2 on a high frequency side so that a rising waveform and a falling waveform of the low frequency-side node voltage Vn are controlled into a linear shape.

A polarity determination circuit IC1 is connected to the input AC power supply 1. A determination output signal thereof is denoted by POL. The polarity determination signal POL is supplied to a controller 21 that forms signals to be supplied to gates of the switching elements (Q1, Q2, Q3, and Q4) of the PFC converter. The controller 21 generates a gate drive signal Q1_G with respect to the FET Q1, a gate drive signal Q2_G with respect to the FET Q2, a gate drive signal Q3_G with respect to the FET Q3, and a gate drive signal Q4_G with respect to the FET Q4 and supplies the gates of the respective FETs with the signals. When the change in the low frequency-side node voltage Vn ends, both the FETs Q1 and Q2 restart switching and return to normal control.

A further description will now be given with reference to FIG. 6A and FIG. 6B. FIG. 6B shows an enlargement of a portion enclosed by a dashed line in FIG. 6A. When the controller 21 detects that the polarity of the AC power supply voltage Vin has changed from positive to negative based on the polarity determination signal POL, the controller 21 stops the gate drive signals Q1_G and Q2_G and places the FETs Q1 and Q2 in an off-state. While the following description provides details of a case where the polarity of Vin changes from positive to negative, all waveforms and control are to be reversed (Q1←→Q2 Q3←→Q4) when the polarity of Vin changes from negative to positive.

Figure 6:
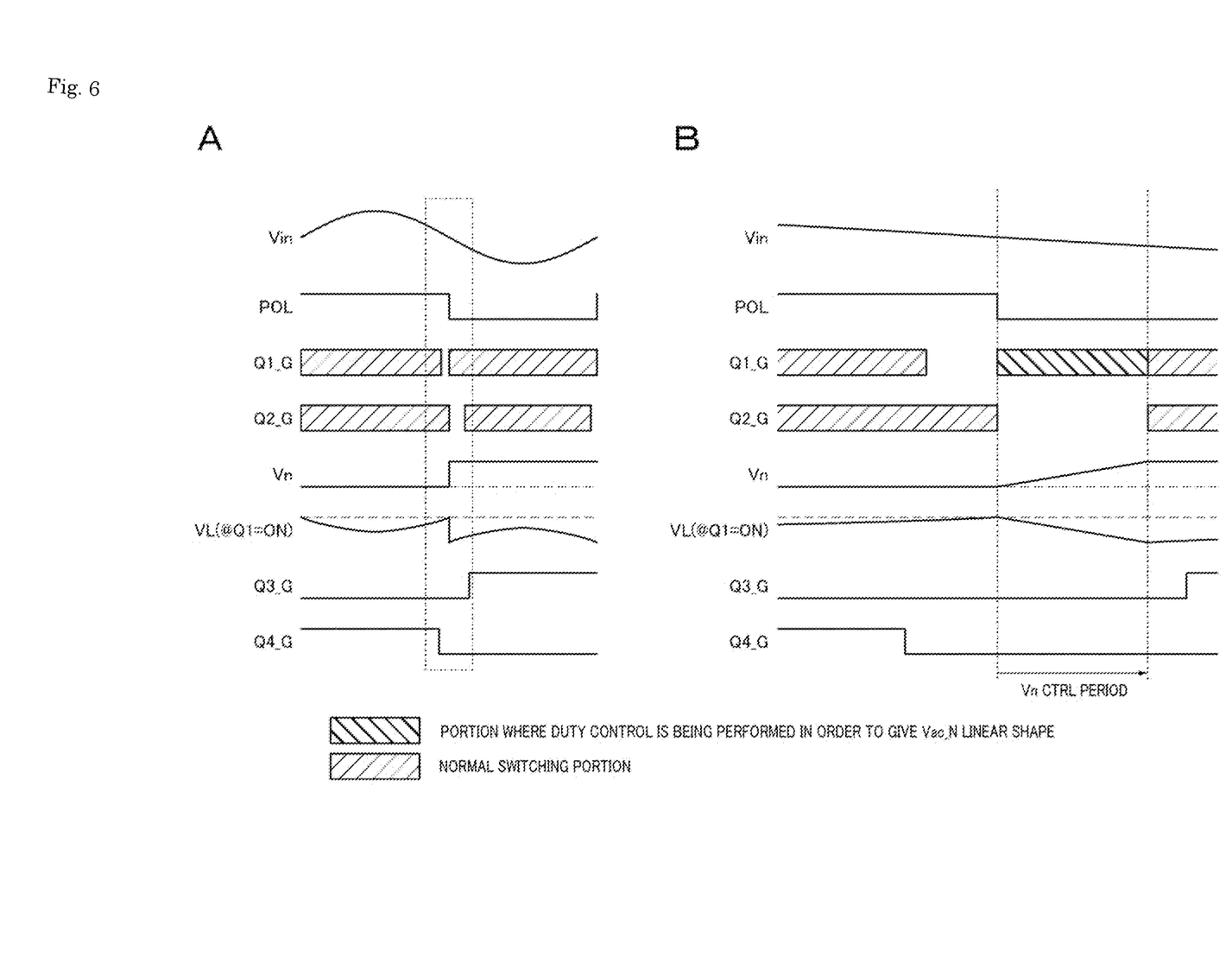
FIG. 6A and FIG. 6B are timing charts used to explain the first embodiment of the present technique.

In FIG. 6, the switching of the gate drive signal Q1_G is stopped earlier than a timing where the polarity of the AC power supply changes in order to suppress a situation where a reduction in an inductor current causes the inductor current to exceed 0 A and flow in reverse and is not directly related to the countermeasure for leakage current reduction according to the present technique. However, when a diode is used in place of active elements such as the MOSFETs Q3 and Q4, the low frequency-side node voltage Vn starts to change once the inductor exceeds 0 A. Therefore, the gate drive signal Q1_G must be stopped and a reverse flow of current must be prevented in order to cause the low frequency-side node voltage Vn to change in an original Vn CTRL period.

During a period from this timing until the AC power supply voltage Vin completes its change or, in other words, a control period (referred to as a Vn CTRL period) during which the low frequency-side node voltage Vn changes from 0 V to Vout, only the gate drive signal Q1_G is supplied and only the FET Q1 is switched. Due to this operation, the capacitances Cp and Cy including parasitic capacitance components of the MOSFETs Q3 and Q4 are only charged and discharged in one direction, thereby facilitating control of the low frequency-side node voltage Vn into a linear shape.

During the Vn CTRL period, when the FET Q1 is in an on-state, voltage VL that is applied to the inductor L differs between a start portion and an end portion of the Vn CTRL period. Furthermore, due to voltage dependency of capacitance values of the capacitances C1 and C2 including the parasitic capacitance components of the MOSFET Q3 and the MOSFET Q4, Vn cannot be caused to change in a linear shape even when a duty of the gate drive signal Q1_G that controls the FET Q1 is controlled so as to increase monotonously. In this case, the duty is a ratio of a duration of a period in which a switching element is in an on-state to a total duration of periods in which the switching element is in an on-state and in an off-state.

Since a peak value of a leakage current is determined by a product (Cp×dV/dt) of the stray capacitance Cp between primary and secondary windings of the transformer 12 and dV/dt (a rate of change in voltage) of voltage that is applied to the stray capacitance, the closer dV/dt in the Vn CTRL period is to being constant or, in other words, the closer the voltage change is to a straight line, the closer the leakage current is to a constant value with little change and the lower the peak value.

Figure 7:
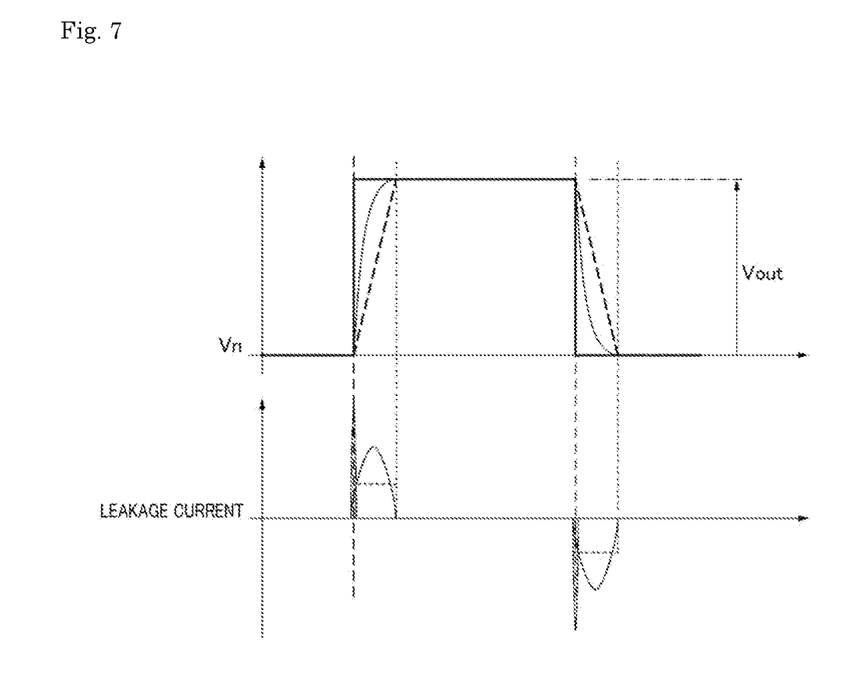
FIG. 7 is a waveform diagram used to explain the present technique.

As shown in FIG. 7, as indicated by a bold solid line representing a change in the low frequency-side node voltage Vn, when a rise and a fall are rapid, a spike-like leakage current with a large peak value occurs. On the other hand, as indicated by a dashed line, when an inclination of the low frequency-side node voltage Vn is constant (this case will be referred to as a change in a linear shape), the peak value of the leakage current can be made smaller as indicated by a dashed line.

Furthermore, when a duty is monotonously increased (the control method described in PTL 1) which represents a departure from the present technique, as indicated by a fine line in FIG. 7, the low frequency-side node voltage Vn has a waveform with a blunt rise. In this case, the peak value of the leakage current can be made smaller as compared to a rapid change. However, compared to a change in a linear shape that is indicated by the dashed line, the peak value of the leakage current is larger and the leakage current cannot be sufficiently suppressed. When the duration is the same, since areas of leakage current are also the same, a leakage current with a waveform that is flat in a height direction will have a smallest peak value.

Figure 8:
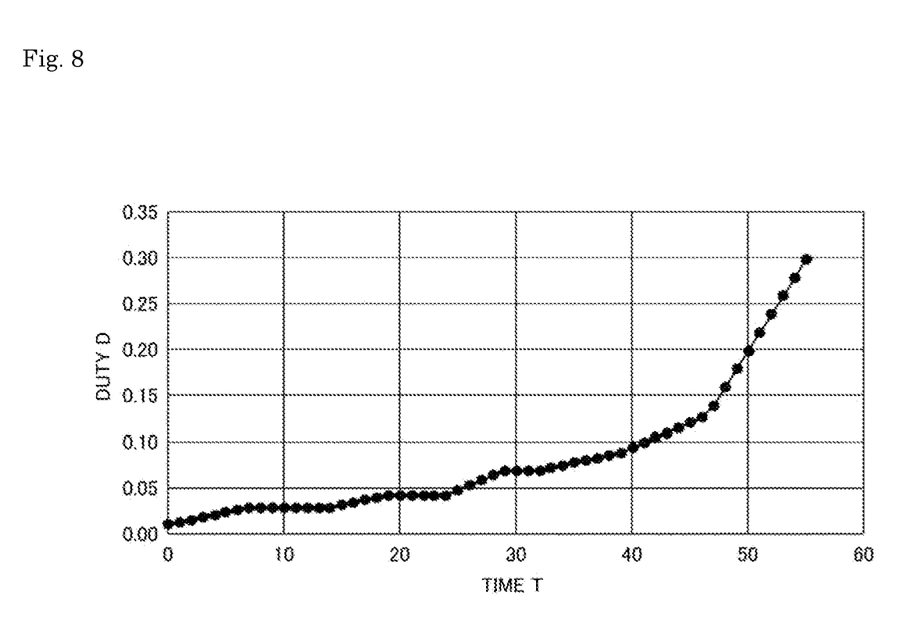
FIG. 8 is a graph showing duty control of the first embodiment of the present technique.

FIG. 8 shows an example of duty control of a high frequency switching signal (the gate drive signal Q1_G with respect to the FET Q1) for causing the low frequency-side node voltage Vn to change in a linear shape. An abscissa represents a time axis of the Vn CTRL period and an ordinate represents duty. During the Vn CTRL period, while the duty tends to increase as a whole, the duty is not controlled to increase linearly and the duty must also be reduced during some periods. A frequency of a high frequency switching signal is a high frequency such as 100 kHz, and each point in FIG. 8 schematically indicates each pulse. Each value of the duty is empirically obtained and provided as a table in, for example, the controller 21.

Figure 9:
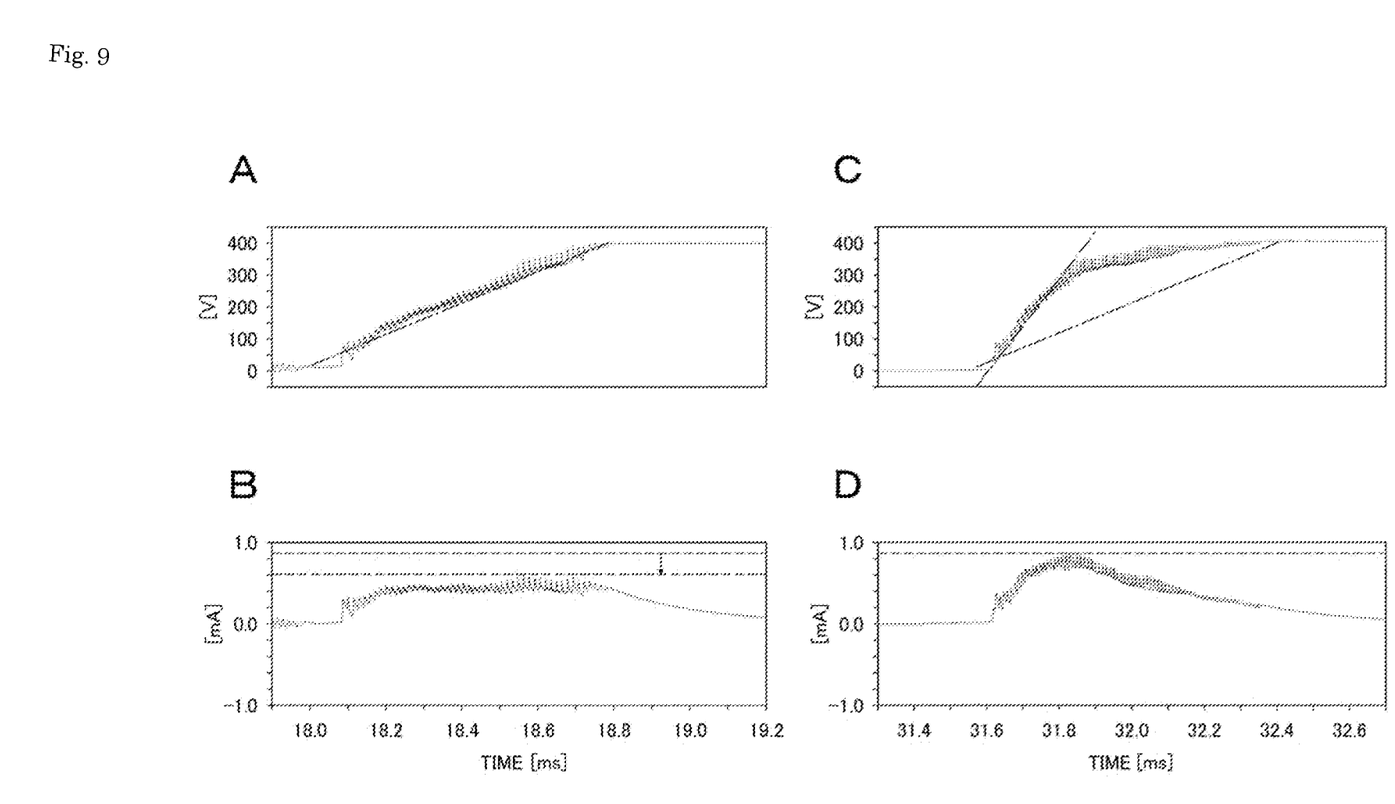
FIG. 9 is a graph for explaining an advantageous effect of the first embodiment of the present technique.

As a result of controlling the duty as shown in FIG. 8, a waveform of the rise of the low frequency-side node voltage Vn can be given a linear shape as shown in FIG. 9A. In addition, a peak of the leakage current can be lowered as shown in FIG. 9B. In contrast, when the duty is controlled so that the waveform of the rise of the low frequency-side node voltage Vn becomes a gradual waveform as shown in FIG. 9C, the leakage current cannot be sufficiently reduced as shown in FIG. 9D. A method of controlling the rising waveform to become gradual as shown in FIG. 9C is described in, for example, PTL 1 that has been mentioned at the beginning of the present description. According to the present technique, an excessive surge current can be prevented from flowing through an inductor at a zero crossing point of input voltage and, at the same time, an effect of suppressing a leakage current is produced.

Modification of First Embodiment

Figure 10:
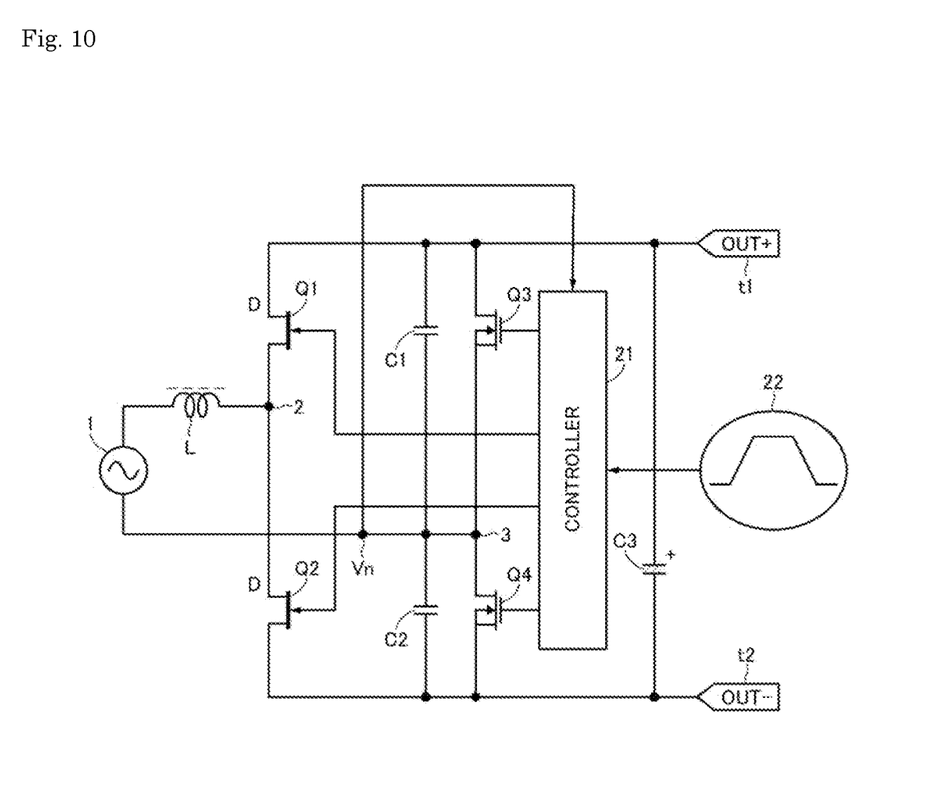
FIG. 10 is a connection diagram showing a modification of the first embodiment of the present technique.

In the first embodiment, a duty of switching of the FET Q1 is controlled so as to cause the low frequency-side node voltage Vn to change linearly. As shown in FIG. 10, the low frequency-side node voltage Vn is fed back to the controller 21. The controller 21 is supplied with a target waveform (a linear reference signal to be a target) 22 in which the rising waveform and the falling waveform are linear. In the controller 21, the gate drive signal Q1_G of the FET Q1 is formed so as to have a duty at which a difference between the fed back low frequency-side node voltage Vn and the target waveform is eliminated. For example, the duty of the gate drive signal Q1_G is controlled in accordance with a polarity and a level of the difference between the fed back low frequency-side node voltage Vn and the target waveform. While the diodes D1 and D2 are not shown in FIG. 10, parasitic diodes that are present between the respective drains and sources of the MOSFET Q3 and the MOSFET Q4 function as the diodes D1 and D2.

Another Modification of First Embodiment

Figure 11:
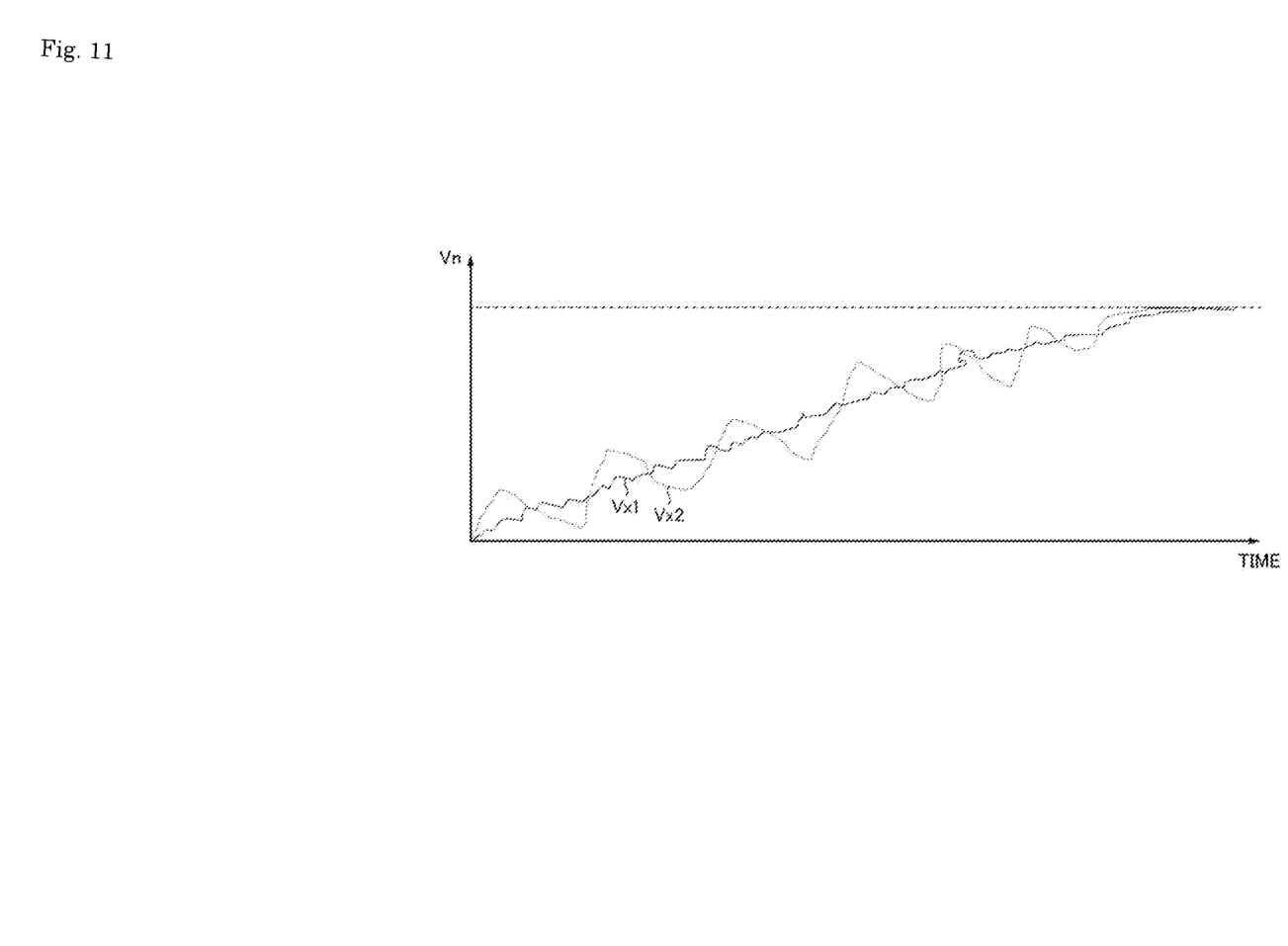
FIG. 11 is a schematic diagram for explaining another modification of the first embodiment of the present technique.

The first embodiment controls the low frequency-side node voltage Vn into a linear shape during the Vn CTRL period. During the Vn CTRL period in which the control is to be performed, the frequency of high frequency switching is preferably set higher as compared to other periods. This point will now be explained with reference to FIG. 11. FIG. 11 schematically shows a change in the low frequency-side node voltage Vn during the Vn CTRL period. FIG. 11 shows an inclined portion Vx1 of the low frequency-side node voltage Vn when the switching frequency is high and an inclined portion Vx2 of the low frequency-side node voltage Vn when the switching frequency is low. A comparison of voltage changes of both cases reveals that a smoother voltage change can be obtained when the switching frequency is high.

3. Second Embodiment

Figure 12:
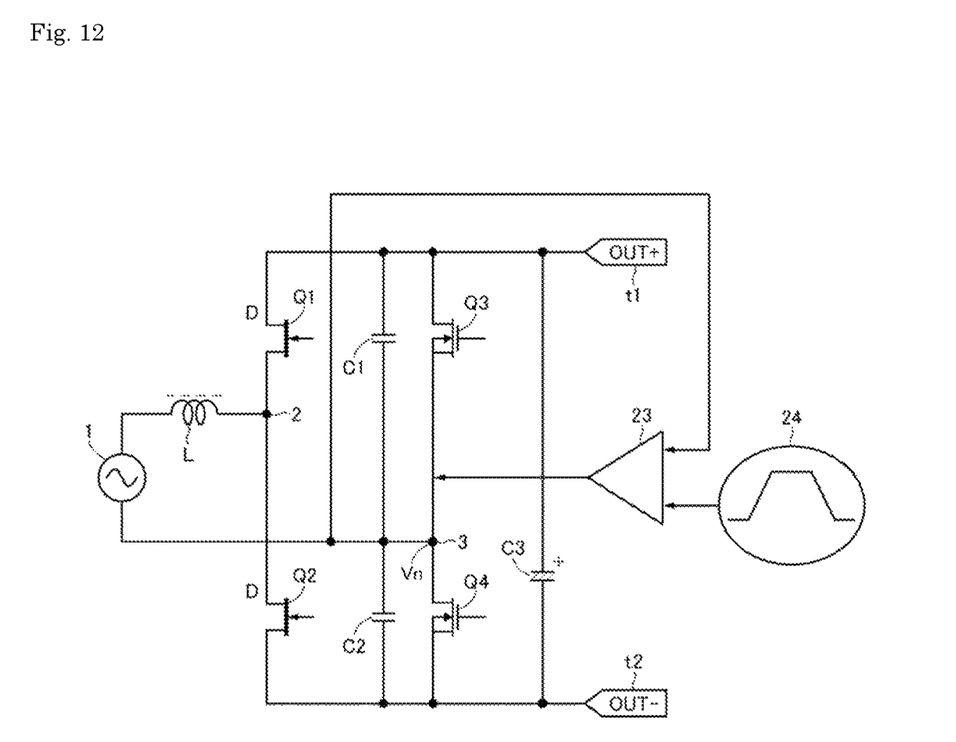
FIG. 12 is a connection diagram of a second embodiment of the present technique.

The present technique is not limited to a method of controlling the duty of high frequency switching and, as shown in FIG. 12, the low frequency-side node voltage Vn may be directly controlled. A linear amplifier 23 is supplied with the low frequency-side node voltage Vn and a target waveform (a linear reference signal to be a target) 24 in which the rising waveform and the falling waveform are linear. A capacitance component of a low frequency-side node is charged or discharged with output of the linear amplifier 23 so as to eliminate a difference between the low frequency-side node voltage Vn and the target waveform 24. Such control enables leakage current to be reduced.

4. Modifications

While embodiments of the present technique have been described with specificity, it is to be understood that the present technique is not limited to the embodiments described above and that various modifications can be made based on the technical ideas of the present technique. Configurations, methods, steps, shapes, materials, numerical values, and the like presented in the embodiments described above are merely examples and, when necessary, different configurations, methods, steps, shapes, materials, numerical values, and the like may be used.

The present technique can also be configured as follows.

(1)

A totem-pole single-phase PFC converter, in which, in a totem-pole single-phase PFC converter, low frequency-side node voltage to which an inductor is not connected is configured to be controlled linearly within two poles of an AC power supply at a timing where a polarity of an input to the AC power supply is reversed.

(2)

The totem-pole single-phase PFC converter according to (1), wherein an insulated converter is connected to an output stage.

(3)

The totem-pole single-phase PFC converter according to (1) or (2), wherein the low frequency-side node voltage is configured to be controlled linearly by controlling a switching duty of a high frequency switching-side half bridge to which the inductor is connected.

(4)

The totem-pole single-phase PFC converter according to (3), wherein a switching duty of one switching element of the high frequency switching-side half bridge is configured to be controlled.

(5)

The totem-pole single-phase PFC converter according to any one of (1) to (4), wherein an active device is used as a low frequency-side rectifying element to which the inductor is not connected, and the low frequency-side node voltage is configured to be controlled linearly by controlling the active device such that the low frequency-side node voltage and a linear reference signal to be a target be equal to each other.

(6)

The totem-pole single-phase PFC converter according to (1), wherein a linear amplifier configured to charge and discharge a capacitance component of the low frequency-side node is provided, and the low frequency-side node voltage is configured to be controlled linearly by controlling the linear amplifier such that the low frequency-side node voltage and a linear reference signal to be a target be equal to each other.

REFERENCE SIGNS LIST

1 AC power supply
2 Low frequency-side node
3 High frequency-side node
21 Controller
22, 24 Target waveform
23 Comparison amplifier

The invention claimed is:

1. A totem-pole single-phase PFC converter, in which, in a totem-pole single-phase PFC converter, low frequency-side node voltage to which an inductor is not connected is configured to be controlled linearly within two poles of an AC power supply at a timing where a polarity of an input to the AC power supply is reversed, wherein an active device is used as a low frequency-side rectifying element to which the inductor is not connected, and the low frequency-side node voltage is configured to be controlled linearly by controlling the active device such that the low frequency-side node voltage and a linear reference signal to be a target be equal to each other.

2. The totem-pole single-phase PFC converter according to claim 1, wherein an insulated converter is connected to an output stage.

3. The totem-pole single-phase PFC converter according to claim 1, wherein the low frequency-side node voltage is configured to be controlled linearly by controlling a switching duty of a high frequency switching-side half bridge to which the inductor is connected.

4. The totem-pole single-phase PFC converter according to claim 3, wherein a switching duty of one switching element of the high frequency switching-side half bridge is configured to be controlled.

5. The totem-pole single-phase PFC converter, in which, in a totem-pole single-phase PFC converter, low frequency-side node voltage to which an inductor is not connected is configured to be controlled linearly within two poles of an AC power supply at a timing where a polarity of an input to the AC power supply is reversed, wherein a linear amplifier configured to charge and discharge a capacitance component of the low frequency-side node is provided, and the low frequency-side node voltage is configured to be controlled linearly by controlling the linear amplifier such that the low frequency-side node voltage and a linear reference signal to be a target be equal to each other.

6. The totem-pole single-phase PFC converter according to claim 5, wherein an insulated converter is connected to an output stage.

7. The totem-pole single-phase PFC converter according to claim 5, wherein the low frequency-side node voltage is configured to be controlled linearly by controlling a switching duty of a high frequency switching-side half bridge to which the inductor is connected.

8. The totem-pole single-phase PFC converter according to claim 7, wherein a switching duty of one switching element of the high frequency switching-side half bridge is configured to be controlled.

9. The totem-pole single-phase PFC converter according to claim 5, wherein an active device is used as a low frequency-side rectifying element to which the inductor is not connected.

* * * * *